(12) United States Patent
De Lamberterie et al.

(10) Patent No.: US 6,910,790 B2
(45) Date of Patent: Jun. 28, 2005

(54) HEADLIGHT HAVING A PIVOTING ELLIPTICAL REFLECTOR AND A FIXED LENS, FOR PRODUCING AN OFFSET OR VERGE BEAM

(75) Inventors: Antoine De Lamberterie, Bobigny Cedex (FR); Jean Matthieu Tourenq, Bobigny Cedex (FR)

(73) Assignee: Valeo Vision (FR)

( * ) Notice: Subject to any disclaimer, the term of this patent is extended or adjusted under 35 U.S.C. 154(b) by 124 days.

(21) Appl. No.: 10/393,645

(22) Filed: Mar. 21, 2003

(65) Prior Publication Data

US 2003/0189822 A1 Oct. 9, 2003

(30) Foreign Application Priority Data

Mar. 28, 2002 (FR) .............................. 02 03935

(51) Int. Cl.⁷ .............................................. F21V 17/02
(52) U.S. Cl. ..................... 362/514; 362/523; 362/512; 362/427
(58) Field of Search .................. 362/512, 514, 362/520, 522, 523, 287, 431, 427

(56) References Cited

U.S. PATENT DOCUMENTS

| | | | |
|---|---|---|---|
| 3,567,919 A | 3/1971 | Alphen | 240/8.25 |
| 4,803,601 A | 2/1989 | Collot et al. | 362/80 |
| 4,827,367 A | 5/1989 | Luciani | 362/61 |
| 4,971,405 A | * 11/1990 | Hwang | 315/77 |
| 5,086,376 A | 2/1992 | Blusseau | 362/61 |
| 5,412,543 A | 5/1995 | Kobayashi et al. | 362/66 |
| 6,007,223 A | * 12/1999 | Futami | 362/517 |
| 6,059,435 A | 5/2000 | Hamm et al. | 362/514 |
| 6,309,094 B1 | 10/2001 | Woerner | 362/539 |
| 6,341,884 B1 | 1/2002 | Leleve et al. | 362/514 |
| 6,447,152 B1 | * 9/2002 | Goebert | 362/485 |
| 2002/0135280 A1 | * 9/2002 | Taniuchi et al. | 313/111 |

FOREIGN PATENT DOCUMENTS

| | | |
|---|---|---|
| FR | 1 536 280 | 8/1968 |
| FR | 2536503 | 5/1984 |
| FR | 2602305 | 2/1988 |
| FR | 2609148 | 7/1988 |
| FR | 2639888 | 6/1990 |
| FR | 2664677 | 1/1992 |
| FR | 2 772 882 | 6/1999 |
| FR | 2 776 366 | 8/1999 |
| WO | WO 99/11969 | 3/1999 |

* cited by examiner

Primary Examiner—Thomas M. Sember
(74) Attorney, Agent, or Firm—Morgan & Finnegan, LLP

(57) ABSTRACT

A headlight for providing a light beam adapted to illuminate the verge of the road. From the rear towards the front along a horizontal reference axis are an elliptical reflector, a light source, and a convergent lens element. The reflector and light source are mounted for pivoting movement, to provide a movable optical axis with respect to the longitudinal axis. The lens is fixed. A lateral portion arranged in an angular sector is swept by the movable optical axis, and is designed to cause the light beam to be modified as a function of the offset angle defined by the movable optical axis with the longitudinal axis.

18 Claims, 4 Drawing Sheets

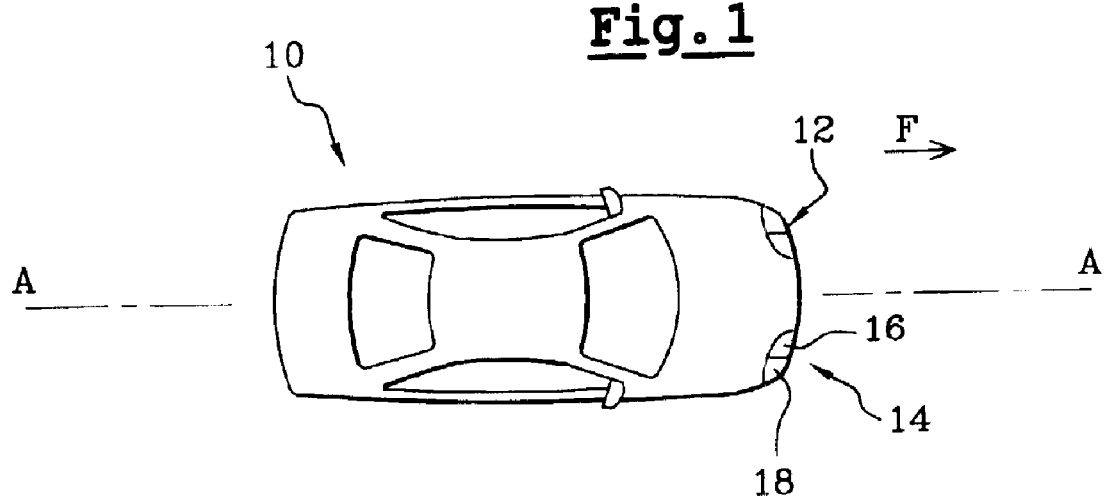
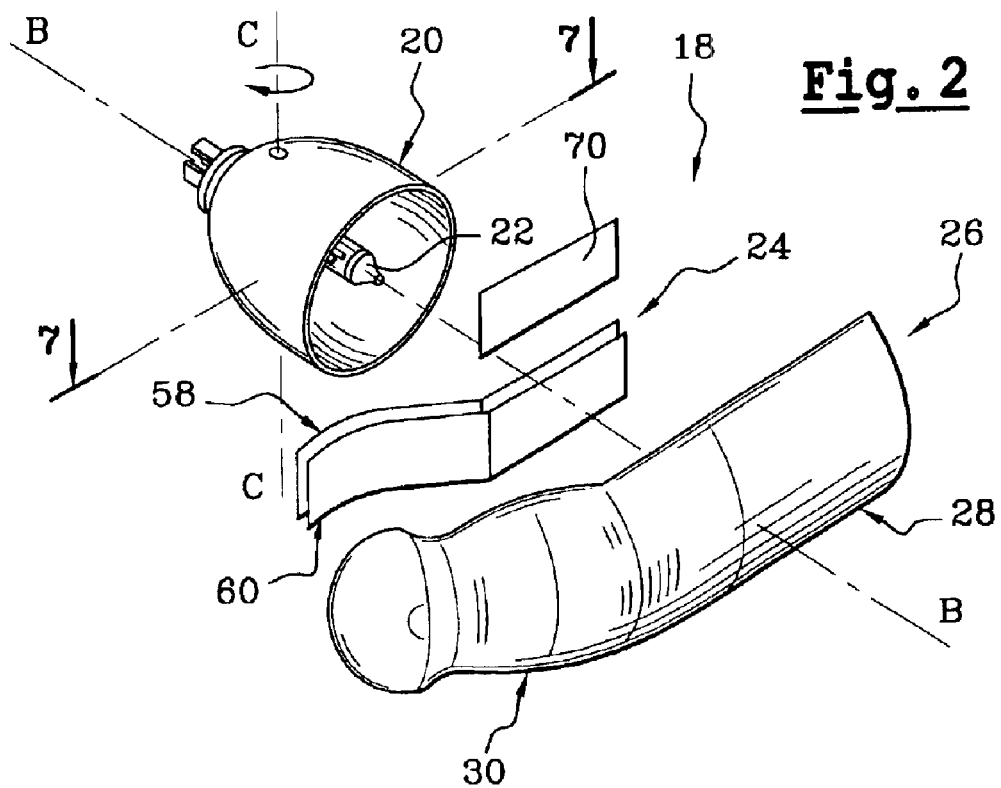

HEADLIGHT HAVING A PIVOTING ELLIPTICAL REFLECTOR AND A FIXED LENS, FOR PRODUCING AN OFFSET OR VERGE BEAM

FIELD OF THE INVENTION

The present invention relates to a motor vehicle headlight.

Most particularly, the present invention relates to a headlight for a motor vehicle, which is designed so as to produce at least one light beam which is adapted to improve the lighting effect when the vehicle is passing along a verge of the road. Such a beam, illuminating the edge of the road on the nearside of the vehicle, will be referred to herein as an offset beam or a verge beam.

The headlight is of the type comprising an optical system which includes, considered from the rear towards the front generally along a horizontal longitudinal reference axis, a reflector of the elliptical type, a light source disposed close to a first focus of the reflector, and a convergent lens element, the headlight being further of the type in which at least the reflector and the light source are mounted for pivoting movement about a substantially vertical axis with respect to a fixed support of the vehicle, as a function of the steering angle of the steerable wheels of the vehicle, thereby defining a movable optical axis with respect to the longitudinal axis.

BACKGROUND OF THE INVENTION

It is already known to provide headlights, in particular of the elliptical type or with complex surfaces, which improve illumination of the road verge. Generally, this type of headlight includes a pivoting assembly consisting of an elliptical reflector, a light source, a mask and a convergent lens.

The offset beam is arranged to be combined with a regulation cruising headlight beam, or main beam.

The offset beam produced by the headlight described above is not satisfactory, because it does not change as a function of the steering angle. The benefit offered by the verge lighting headlight is comparable to a pocket torch beam which can be aimed to a greater or lesser extent in the direction of the verge of the road.

One drawback of this type of verge or offset beam is the presence of "holes" in the light on the road in front of the vehicle, that is to say less well lighted zones between the main beam and the verge beam, at offset angles above 25 degrees.

The large physical size of this type of headlight is a disadvantage because the volume swept by the pivoting assembly is very large.

In addition, the mechanical requirements relating to the headlight are substantial, given that there are many moving parts.

A large number of moving parts is also a source of difficulties for adjustment of the components in relation to each other, and for the inclusion of the headlight in an optical unit of the vehicle.

A further disadvantage is the cost of this type of headlight.

DISCUSSION OF THE INVENTION

The invention aims to overcome these drawbacks.

To this end, the invention proposes a headlight of the type set forth above, characterised in that the lens element is fixed with respect to the support, and in that the lens element comprises a lateral portion disposed beside the longitudinal axis in an angular sector which is able to be swept by the movable optical axis, and which is adapted to cause the offset beam to be modified as a function of the offset angle defined between the movable optical axis and the longitudinal axis.

Thanks to the headlight of the invention, the offset beam develops as a function of the steering angle, in such a way that there is some continuity between the offset beam obtained and the main beam, and also in such a way that the offset beam is more homogeneous in its light distribution, especially at offset angles in the range between 10 and 60 degrees.

In addition, the headlight of the invention enables the number of moving parts to be reduced, which reduces the mechanical constraints imposed by the headlight.

According to an additional feature of the headlight of the invention, the lens element comprises a front portion adjacent to the lateral portion, the optical axis of which is substantially parallel to the longitudinal axis, with its focal plane being situated close to the second focus of the reflector, when the reflector is occupying its angular rest position, wherein the movable optical axis is substantially coincident with the longitudinal axis, so that the headlight is able to produce at least one additional regulation lighting beam, for example a lighting beam for motorway driving, when the reflector is occupying its rest position.

Thus, the headlight according to the invention enables at least one supplementary function to be obtained, which is of advantage, in particular in terms of the cost and physical size of the assembly that consists of the various lighting elements with which the vehicle is equipped.

According to further features of the invention:

the lateral portion of the lens element includes a lateral end portion, having an optical axis which forms with the longitudinal axis a predetermined angle that is substantially equal to the maximum offset angle;

the lateral portion of the lens element comprises at least one intermediate portion which is adjacent to the lateral end portion, and which, in cross section through a vertical plane, has a convex profile which develops angularly along the lateral portion, whereby the width of the offset beam increases progressively from the rest position as the offset angle increases;

the front portion of the lens element is a semi-cylindrical lens with a substantially horizontal axis, and the lateral end portion of the lateral portion is a lens portion of the spherical type;

the reflector has a substantially parabolic horizontal generatrix and a substantially elliptical vertical generatrix;

the front portion of the lens element is a lens portion of the spherical type, and the lateral end portion of the lateral portion is a semi-cylindrical lens with a substantially horizontal axis;

the headlight further includes a fixed mask which is disposed longitudinally between the reflector and the lens element, and which includes:

a front portion which is substantially orthogonal to the longitudinal axis and which is disposed generally in the focal plane of the front portion of the lens element; and a lateral portion which is so configured that it is substantially orthogonal to at least one optical axis of the lateral portion of the lens element;

the mask includes an upper part which is disposed generally in the focal plane of the front portion of the lens element, and which delimits, with the front portion of the mask, a window for passage of light rays through it, whereby to reduce near lighting emitted by the headlight on the road when the reflector is occupying its angular rest position;

each of the front portion and lateral portion of the mask consists of two generally rectangular plates which are disposed parallel to each other and aligned longitudinally.

Further features and advantages of the invention will appear from the description of some preferred embodiments of the invention which is given below, by way of non-limiting example only and with reference to the accompanying drawings.

BRIEF DESCRIPTION OF THE DRAWINGS

FIG. 1 is a top plan view showing diagrammatically a vehicle which is equipped with a lighting system according to the features of the invention.

FIG. 2 is a perspective view showing diagrammatically the additional headlight in the right hand optical unit of the vehicle shown in FIG. 1.

DESCRIPTION OF PREFERRED EMBODIMENTS OF THE INVENTION

Figure 3:
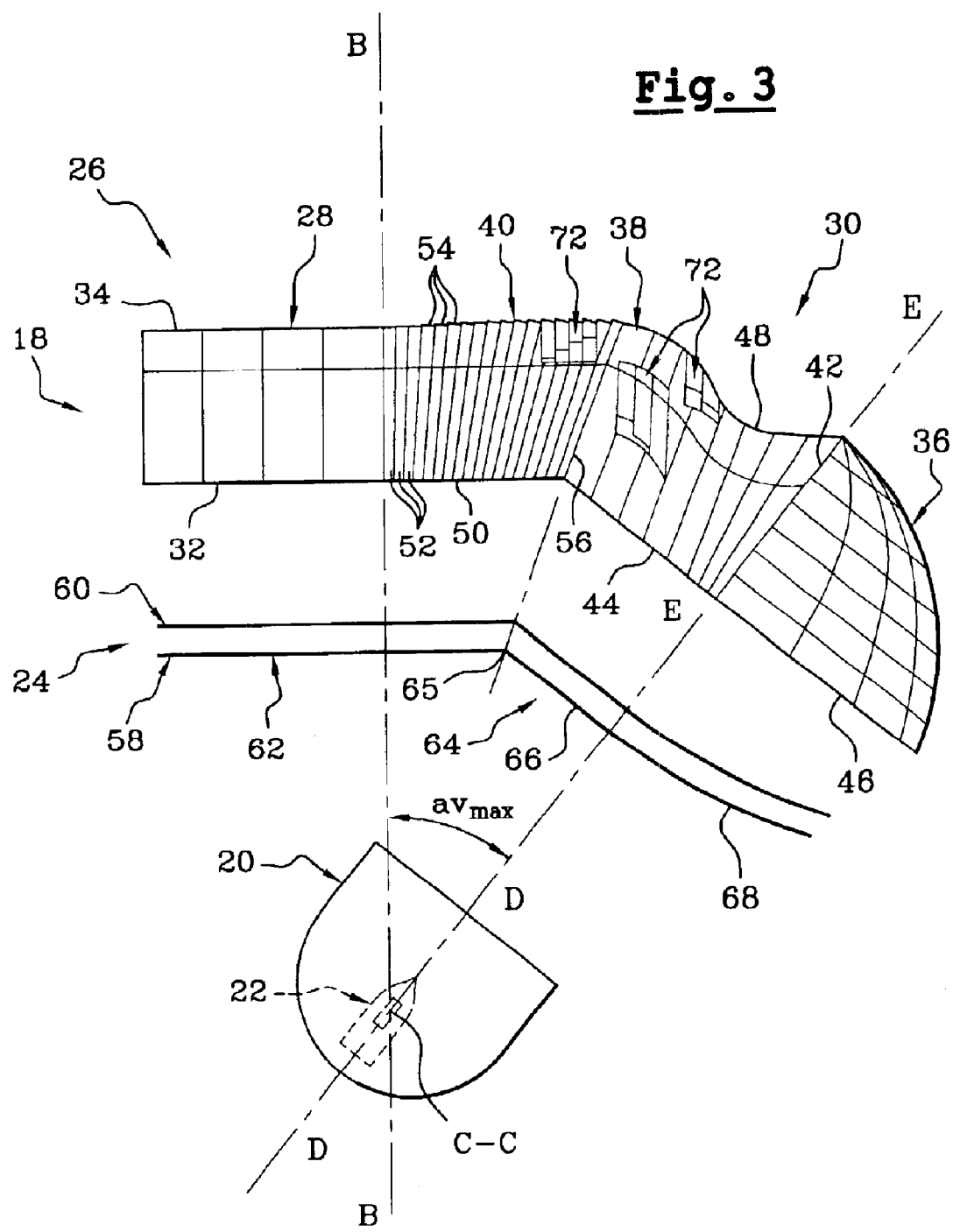
FIG. 3 is a top plan view showing diagrammatically the additional headlight of FIG. 2.

FIG. 1 shows a motor vehicle 10 having at the front two headlight clusters, namely a left-hand cluster 12 and a right-hand cluster 14, which are also referred to herein as optical units.

In the remainder of this description, the convention will be adopted, though without implying any limitation, that a forward orientation, that is to say an orientation from the back going towards the front, along the longitudinal axis A—A of the vehicle 10, corresponds to orientation from left to right with reference to FIG. 1.

Each optical unit 12, 14 comprises in this example a main headlight 16 which is so designed as to produce a regulation lighting beam Fc of the main or cruising beam type, together with an additional headlight 18 which is made in accordance with the features of the invention and which is designed to produce, in particular, a regulation lighting beam of the offset or verge type, that is to say a beam that illuminates the verge on the nearside of the road. This beam will be referred to as the offset or verge beam, Fv.

In the remainder of this description, the invention will be described as being applied to the additional headlight 18 of the right-hand headlight cluster 14, it being understood that the elements of the left-hand headlight cluster 12 are arranged generally symmetrically to those of the right-hand unit with respect to a vertical plane of symmetry passing through the axis A—A of the vehicle 10.

The main elements of the additional headlight 18 are shown diagrammatically in FIG. 2, to which reference is now made.

The additional headlight 18 is of the type that reproduces a luminous image and is commonly called a headlight of the elliptical type.

The optical system of the additional headlight 18 accordingly comprises, arranged in the forward direction generally along a longitudinal horizontal reference axis B—B parallel to the axis A—A of the vehicle 10, an elliptical reflector 20, a light source 22 arranged in the vicinity of a first focus of the reflector 20, a mask 24, and a convergent lens element 26.

In the embodiment shown here, the reflector 20 has a substantially parabolic horizontal generatrix and a substantially elliptical vertical generatrix.

In accordance with the features of the present invention, only the reflector 20 and light source 22 are mounted for pivoting movement about a substantially vertical axis, C—C, with respect to a fixed support (not shown) of the vehicle 10, in response to the steering angle of the steerable wheels of the vehicle 10. Accordingly, the mask 24 and lens element 26 are fixed.

The reflector 20 and light source 22 define a movable optical axis D—D (FIG. 3) with respect to the longitudinal axis B—B. The movable axis D—D in this example is substantially horizontal, and it may be defined for example by the two foci of the elliptical reflector 20.

In FIG. 2, the reflector 20 is in an angular rest position in which the movable axis D—D is coincident with the longitudinal reference axis B—B. As the reflector 20 pivots in the clockwise direction, with reference to FIG. 3, the movable axis D—D defines, with the longitudinal reference angle B—B, a so-called offset or verge angle av.

The particular form of the lens element 26 will now be described with particular reference to FIGS. 2 and 3.

The form of the lens element 26 is preferably obtained and optimised by carrying out simulations, in particular with the aid of information technology.

For reasons of ease of manufacture, in this example it is chosen that in the lens element 26, its rear input faces 32, 44, 46, 50, that is to say those faces which are disposed on the same side as the light source 22, are flat.

In other versions not shown, the rear input faces 32, 44, 46, 50 could also take any other forms such as cylindrical or spherical.

In the embodiment shown here, the lens element 26 comprises:

a so-called front portion 28 which is adjacent to the left hand side of the longitudinal axis B—B; and a so-called lateral portion 30, which is adjacent to the right hand side of the longitudinal axis B—B and is arranged in an angular sector over which the movable optical axis D—D can sweep.

The front portion 28 is so designed as to enable the additional headlight 18 to produce at least one regulation additional lighting beam, for example a lighting beam for motorway (thruway) cruising, namely a main beam Fa, when the reflector 20 is in its angular rest position.

In order to produce the main beam Fa, the light beams should be concentrated in the longitudinal axis B—B.

The optical axis of the front portion 28 is parallel to the longitudinal reference axis B—B, and its focal plane is situated close to the second focus of the reflector 20, when the reflector 20 is in its angular rest position.

In this example, the front portion 28 is made in the form of a semi-cylindrical flat convex lens, that is to say the front portion defines a half-cylinder with an axis which is horizontal and perpendicular to the longitudinal axis B—B.

When the reflector 20 is in its rest position, the light rays emitted by the source 20 penetrate into the front portion 28 through its flat rear face 32 which is generally at right angles to the longitudinal axis B—B, and they leave via its convex cylindrical face 34.

The lateral portion 30 is so designed as to cause the offset beam Fv to be modified according to the offset angle av defined by the movable axis D—D with the longitudinal axis B—B. More particularly, the lateral portion 30 must give rise to a horizontal offset of the verge beam Fv which is proportional to the offset angle av.

In the embodiment shown here, the lateral portion 30 includes, considered from right to left in FIG. 3:

a lateral end portion 36 having an optical axis E—E which defines, with the longitudinal axis B—B, a predetermined angle that is substantially equal to the maximum offset angle $av_{max}$;

a first intermediate portion 38 which is adjacent to the left-hand side of the lateral end portion 36; and a second intermediate portion 40 which is adjacent to one side of the first intermediate portion 38, and adjacent to the other side of the front portion 28.

The lateral end portion 36 is here in the form of planar-convex half lens of the spherical type. The expression "of the spherical type" is used here to designate the general form of the lens, which is generally one of revolution.

The end portion 36 has a semi-circular edge 42 which is adjacent to the first intermediate portion 38, so that there is no interruption between the surfaces of the end portion 36 and those of the first intermediate portion 38.

The optical axis E—E of the end portion 36 passes through the plane which is defined by the semi-circular edge 42. It corresponds to the optical axis of the complete spherical lens.

The first intermediate portion 38 is generally in the form of a semi-cylindrical lens, the axis of the cylinder being horizontal and at right angles to the optical axis E—E of the end portion 36.

The rear input face 44 of the first intermediate portion 38 is flat, and it extends the rear input face 46 of the end portion 36 towards the left, with reference to FIG. 3.

The convex output face 48 of the first intermediate portion 38 has a wavy profile and a horizontal plane, as can be seen in the top plan view of FIG. 3.

This wavy profile arises from the fact that the convex profile of the first intermediate portion 38, as seen in cross section through a vertical plane, develops angularly along the lateral portion 30 in such a way that the width of the offset beam Fv increases progressively with increase in the offset angle av from the rest position.

The wavy profile also has to enable light to be applied in a zone to the right of the offset beam Fv, for example for an offset angle av in the range between 10 and 20 degrees, and in a left hand zone of the offset beam Fv, for example over a range of offset angle av between 20 and 30 degrees.

The second intermediate portion 40 in this example is configured as a semi-cylindrical lens which is an extension of the front portion 28.

The front input face 50 of the second intermediate portion 40 is therefore flat, and it extends the rear input face 32 of the front portion 28 to the right with reference to FIG. 3.

The profile of the second intermediate portion 40, seen in cross section through a vertical plane, develops angularly along the lateral portion 30 in such a way that the width of the offset beam Fv increases progressively as the offset angle av increases from the rest position.

The second intermediate portion 40 consists of a number of elementary semi-cylindrical end portions 52, each of which has a convex output face 54 which is inclined in a horizontal plane with respect to the output face 34 of the front portion 28.

The inclination of the output face 54 of each elementary portion 52 is such that this output face 54 is substantially orthogonal to the associated offset angle av, that is to say the angle of incidence of the movable optical axis D—D on the input face 50 of the elementary portion 52 concerned.

In order to make it easier to understand the invention, FIG. 3 shows a predetermined number of elementary portions 52, and the amount of the offset between two adjacent output faces 54, which forms a sawtooth profile, is exaggerated in the drawing. In practice it is in fact preferable to make the intermediate portion 40 with an infinite number of elementary portions 52, such that the value of the inclination of the output faces 54 develops substantially continuously from left to right with reference to FIG. 3.

The first intermediate portion 38 and the second intermediate portion 40 define between them a junction plane 56 which is generally vertical and contains a predetermined offset angle av.

The lens element 26 is preferably formed by moulding in two parts, which are for example assembled together by adhesive bonding. A first part consists of the front portion 28 and the second intermediate portion 40, while the second part consists of the end portion 36 and the first intermediate portion 38. This two-part design is easier to strip from the mould, which reduces the manufacturing cost of the lens element 26.

In general terms, it is found that the lateral portion 30 of the lens element 26 defines a series of elementary optical axes which are inclined progressively towards the right with respect to the longitudinal reference axis B—B, generally following the angular development of the movable optical axis D—D of the reflector 20.

Flutes or grooves 72 are preferably formed in suitable zones of the convex surface 48, 54 of the intermediate portions 38 and 40 of the lateral portion 30 of the lens element 26. These flutes or grooves 72 modify the path of the light rays locally so as to redistribute luminous energy in the dipped beam Fv in a homogeneous and optimum manner.

The flutes or grooves 72 are for example in the form of prisms or furrows, the form and position of which are calculated using appropriate computer techniques.

The mask 24, which is arranged to define a cut-off in the lighting beam produced by the additional headlight 18, will now be described with reference to FIGS. 2 and 3.

The mask 24 is provided for the purpose of forming an obstacle to the light rays emitted by the headlight 18 above the horizon line in front of the vehicle 10.

The mask 24 consists mainly of two parallel, vertical, rectangular plates 58 and 60 which are identical to each other, and which are arranged one behind the other along the longitudinal axis B—B. These two plates are generally in longitudinal alignment.

Each plate 58, 60 consists of:
- a front portion 62 which is substantially at right angles to the longitudinal axis B—B, and which lies generally in the local plane of the front portion 28 of the lens element 26; and
- a lateral portion 64 which is so configured that it is substantially at right angles to at least one optical axis of the lateral portion 30 of the lens element 26.

The lateral portion 64 and front portion 62 together define a junction edge 65 at the level of the offset angle av that corresponds to the junction plane.

The lateral portion 64 in this example includes a first portion 66 which extends from the edge 65 to the optical axis E—E of the end portion 36 of the lens element 26, and which is substantially parallel to the input face 44 of the first intermediate portion 38 of the lens element 26.

The lateral portion 64 also includes a second portion 68 which extends from the optical axis E—E of the end portion 36 towards the right with reference to FIG. 3, and which is curved towards the lens element 26 in such a way that the profile defined by the second portion 68, as seen in cross section through a horizontal plane, is substantially contained in the focal plane of the end portion 36 which follows generally a curved profile.

The use of two parallel plates 58 and 60 to constitute the mask 24 serves to give the mask 24 some thickness with a view to compensating for variations in the value of the focal distance, as a function of the angular position of the reflector 20.

In another version (not shown) it is possible to replace the two plates 58 and 60 of the mask 24 by a single, thicker, plate.

If a single thinner plate 58 is used, the image of the cut-off defined by the upper edge of the mask 24 may lack sharp definition.

The mask 24 preferably also includes an upper portion in the form of an additional, rectangular, vertical plate 70 (FIG. 2), which is arranged in this example in the same plane as the front portion 62 of the rear plate 58, above the latter.

Thus, the lower edge of the additional plate 70 defines, with the upper edge of the front portion 62, a "window" of predetermined height for passage of light rays emitted by the light source 22.

The function of the additional plate 70 is to reduce the height of the light beam produced by the headlight 18 in the longitudinal direction. In particular, the additional plate 70 aims to reduce the amount of near lighting, that is to say light directed on to the ground close to the vehicle, when the reflector 20 is in its rest position and the headlight 18 is producing a main beam Fa.

Figure 4:
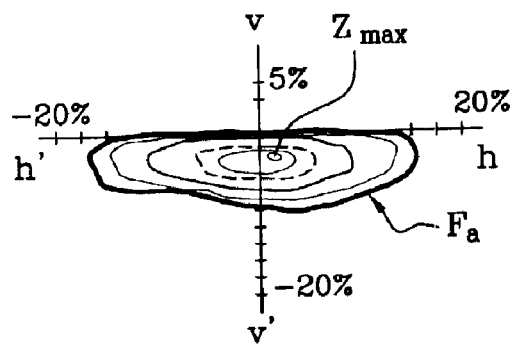
FIG. 4 is a diagram showing, in the form of isolux curves, the main beam, or cruising beam, produced by the additional headlight of FIG. 2 when the reflector is in its angular rest position.
Figure 5:
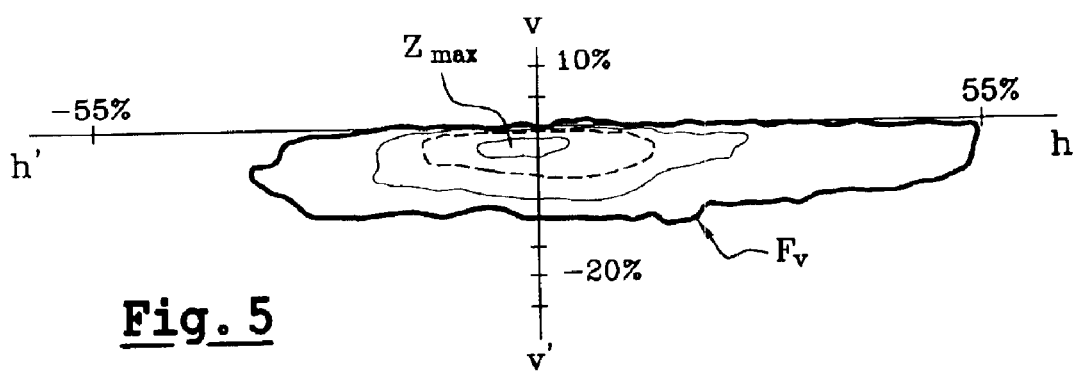
FIG. 5 is a diagram similar to that in FIG. 4, but shows the dipped beam produced by the additional headlight of FIG. 2 when the reflector defines an offset or verge angle of 20 degrees with respect to a longitudinal reference axis.
Figure 6:
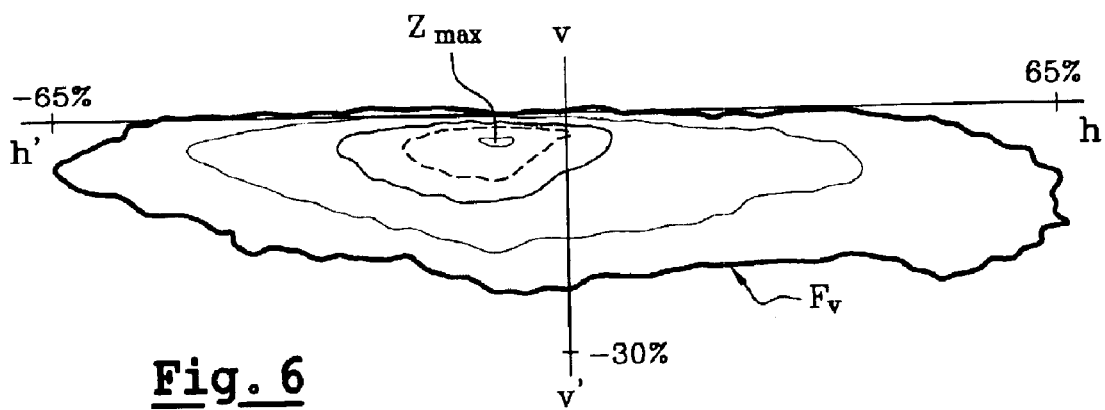
FIG. 6 is a diagram similar to that in FIG. 4, but shows the dipped beam produced by the additional headlight of FIG. 2 when the reflector defines a verge angle of 40 degrees with respect to the longitudinal reference axis.

The operation of the additional headlights 18 of the vehicle 10 will now be described, with reference in particular to FIGS. 4 to 6. FIGS. 4 to 6 show the distribution of light energy on a screen placed 25 metres in front of the vehicle 10.

It will be noted that the additional headlights 18 are arranged to operate simultaneously with the main or cruising beam headlights 16 of the vehicle. The main beam headlights 16 will therefore be taken to be lit for all lighting functions.

When the vehicle 10 is travelling generally in a straight line, the reflector 20 is in its angular rest position.

When the vehicle is travelling on a motorway, the additional headlights 18 of the two optical units 12 and 14 are also lit. Each one then produces an additional lighting beam or main beam Fa. The main beam Fa produced by the additional headlight 18 in the right hand optical unit 14 is illustrated by the isolux curves in FIG. 4.

In FIG. 4 it will be seen that this light beam Fa is centred generally on the vertical axis v'v, and it defines a clean cut-off on the horizontal axis h'h.

The zone of maximum lighting, $Z_{max}$ in this example is slightly offset to the right of the vertical axis v'v. This offset is compensated for by the main beam Fa (not shown) which is produced by the additional headlight 18 in the left hand optical unit 12, the zone of maximum lighting $Z_{max}$ of which is offset symmetrically to the right of the axis v'v, in such a way that the overall main beam Fa formed by the superimposition of the main beams Fa of the two additional headlights 18 is centred on the vertical axis v'v.

When the vehicle 10 is a vehicle with right-hand drive, travelling on roads other than motorways and driving on the right, and is following a verge, for example a verge that curves towards the right, the steering angle of the wheels increases from zero. The additional headlight 18 in the right-hand headlight cluster 14 is lit, and the reflector 20 pivots in proportion to the steering angle, thereby forming an offset angle or verge angle av with respect to the longitudinal reference axis B—B.

The offset beam Fv produced by the additional headlight 18, for an offset angle of about 20 degrees, is illustrated by the isolux curves in FIG. 5. It will be noted that in FIG. 5, the axis v'v is offset by 20 degrees to the right with respect to the longitudinal axis B—B, whereas in FIG. 4, the axis v'v is at right angles to the longitudinal axis B—B.

It is found that the offset beam Fv for an offset angle of about 20 degrees is much wider than the main beam Fa, especially towards the right with respect to the vertical axis v'v, whereas the maximum lighting zone $Z_{max}$ is generally centred on the vertical axis v'v.

Similarly, the offset beam Fv produced by the additional headlight 18 for an offset angle av of about 40 degrees is illustrated by the isolux curves in FIG. 6, in which the vertical axis v'v is offset by 40 degrees to the right from the longitudinal axis B—B.

Here, the offset beam Fv is even wider, with a slight offset of the maximum lighting zone $Z_{max}$ towards the left with respect to the vertical axis v'v, and the beam Fv in FIG. 6 is also greater in depth (height).

Figure 7:
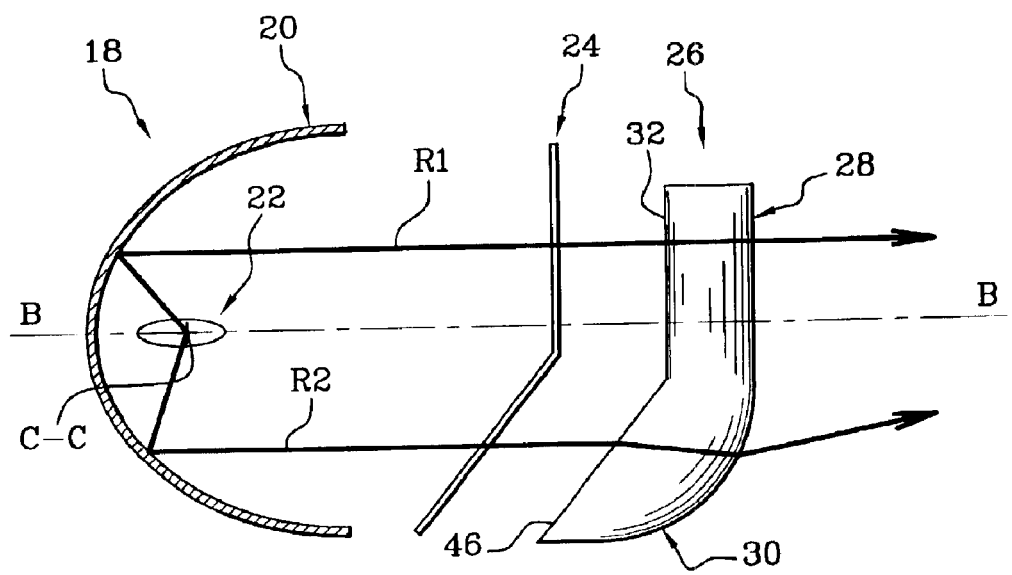
FIG. 7 is a view in partial axial cross section taken on the cross sectional plane 7—7 in FIG. 2, and shows diagrammatically the operation of the additional headlight of FIG. 2 when the reflector is in its angular rest position.

Reference is now made to FIG. 7, which illustrates diagrammatically the operation of the additional headlight 18 when producing a main beam Fa. Here it will be seen that, in a horizontal plane passing through the optical axes of the lens element 26, the reflector 20 having a parabolic profile in this case, the light rays R1 and R2 which are emitted by the light source 22 towards the reflector 20 are reflected towards the lens element 26 in a direction which is substantially parallel to the longitudinal axis B—B.

The rays 21 that reach the rear face 32 of the front portion 28 are not diverted by the lens element 26. However, the rays that reach the rear face 46 of the lateral portion 30 are diverted towards the longitudinal axis B—B.

Figure 8:
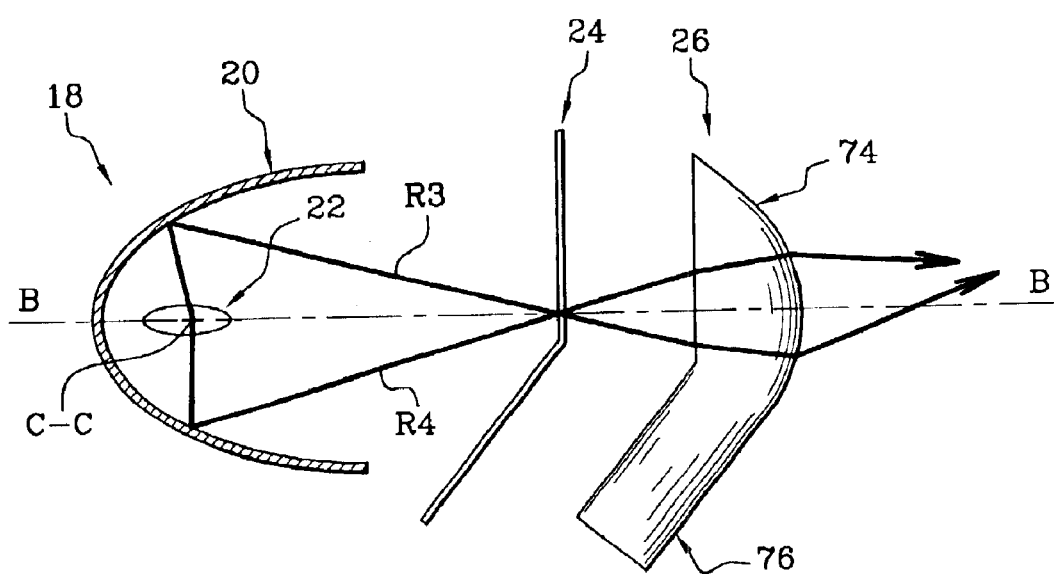
FIG. 8 is a view similar to that in FIG. 7, but shows diagrammatically the operation of a modified version of the additional headlight, according to the features of the invention, when the reflector is in its angular rest position.

Reference is now made to FIG. 8 showing a modified embodiment of the invention. In FIG. 8, the front portion 74 of the lens element 26 is configured as a half lens of the spherical type, and the lateral portion 76 is configured as a semi-cylindrical lens.

With this form of lens element 26, and in order that the width of the offset or verge beam Fv will increase with the offset angle av, it is necessary to provide a reflector 20 having a horizontal generatrix and a vertical generatrix that are generally elliptical. Thus, the imaging of the light beam Fa in the axis A—A of the vehicle is optimised, and the imaging of the offset beam Fv on the side is distributed laterally.

Operation of the headlight 18 in this version is illustrated by FIG. 8. It can be seen that, in a horizontal plane passing through the optical axes of the lens element 26, the reflector 20 having an elliptical profile, the light rays R3 and R4 which are emitted by the light source 22 towards the reflector 20 are reflected convergently towards the second focus of the ellipse defined by the reflector 20. The rays R3 and R4 therefore reach the rear input face of the lens element 20 with predetermined angles of inclination, such that these rays R3 and R4 are diverted by the front portion 74 and the lateral portion 76 of the lens element 26 towards the longitudinal axis B—B.

What is claimed is:

1. A headlight for a motor vehicle, which is designed so as to produce at least one light beam referred to as an offset beam in order to improve the lighting effect when the vehicle is passing along a verge, the headlight being of the type comprising an optical system which includes, considered from the rear towards the front generally along a horizontal longitudinal reference axis,
a reflector of the elliptical type,
a light source disposed close to a first focus of the reflector, and
a convergent lens element, the headlight being further of the type in which at least the reflector and the light source are mounted for pivoting movement about a substantially vertical axis with respect to a fixed support of the vehicle, as a function of the steering angle of the steerable wheels of the vehicle, thereby defining a movable optical axis with respect to the longitudinal axis, wherein the lens element is fixed with respect to the support, and the lens element comprises a lateral portion disposed beside the longitudinal axis in an angular sector which is able to be swept by the movable optical axis, and which is adapted to cause the offset beam to be modified as a function of the offset angle defined between the movable optical axis and the longitudinal axis.

2. A headlight according to claim 1, wherein the lens element comprises a front portion adjacent to the lateral portion, the optical axis of which is substantially parallel to the longitudinal axis, with its focal plane being situated close to the second focus of the reflector, when the reflector is occupying its angular rest position,
wherein the movable optical axis is substantially coincident with the longitudinal axis, so that the headlight is able to produce at least one additional regulation lighting beam, when the reflector is occupying its rest position.

3. A headlight according to claim 2, further including a fixed mask which is disposed longitudinally between the reflector and the lens element, and which includes:

a front portion which is substantially orthogonal to the longitudinal axis and which is disposed generally in the focal plane of the front portion of the lens element; and
a lateral portion which is so configured that it is substantially orthogonal to at least one optical axis of the lateral portion of the lens element.

4. A headlight according to claim 3, wherein the mask includes an upper part which is disposed generally in the focal plane of the front portion of the lens element, and which delimits, with the front portion of the mask, a window for passage of light rays through it, whereby to reduce near lighting emitted by the headlight on the road when the reflector is occupying its angular rest position.

5. A headlight according to claim 3, wherein each of the front portion and lateral portion of the mask consists of two generally rectangular plates which are disposed parallel to each other and aligned longitudinally.

6. A headlight according to claim 1, wherein the lateral portion of the lens element includes a lateral end portion, having an optical axis which forms with the longitudinal axis a predetermined angle that is substantially equal to the maximum offset angle.

7. A headlight according to claim 6, wherein the lateral portion of the lens element comprises at least one intermediate portion which is adjacent to the lateral end portion, and which, in cross section through a vertical plane, has a convex profile which develops angularly along the lateral portion, whereby the width of the offset beam increases progressively from the rest position as the offset angle increases.

8. A headlight according to claim 6, wherein the lens element comprises a front portion adjacent to the lateral portion, the optical axis of which is substantially parallel to the longitudinal axis, with its focal plane being situated close to the second focus of the reflector, when the reflector is occupying its angular rest position, the movable optical axis being substantially coincident with the longitudinal axis, so that the headlight is able to produce at least one additional regulation lighting beam, when the reflector is occupying its rest position, and wherein the front portion of the lens element is a semi-cylindrical lens with a substantially horizontal axis, and the lateral end portion of the lateral portion is a lens portion of the spherical type.

9. A headlight according to claim 8, wherein the reflector has a substantially parabolic horizontal generatrix and a substantially elliptical vertical generatrix.

10. A headlight according to claim 6, wherein the lens element comprises a front portion adjacent to the lateral portion, the optical axis of which is substantially parallel to the longitudinal axis, with its focal plane being situated close to the second focus of the reflector, when the reflector is occupying its angular rest position, the movable optical axis being substantially coincident with the longitudinal axis, so that the headlight is able to produce at least one additional regulation lighting beam, when the reflector is occupying its rest position, and wherein the front portion of the lens element is a lens portion of the spherical type, and the lateral end portion of the lateral portion is a semi-cylindrical lens with a substantially horizontal axis.

11. A headlight for a vehicle with a plurality of steerable wheels, the headlight comprising, in a direction along a horizontal longitudinal reference axis:

an elliptical reflector;
a light source disposed close to a first focus of the elliptical reflector, the light source adapted to produce, together with the elliptical reflect, an offset beam, the light source and the elliptical reflecting being pivotally mounted for movement from an angular rest position to a maximum offset position about a substantially vertical axis with respect to a fixed support of the vehicle, as a function of a steering angle of the steerable wheels to define a movable optical axis with respect to the longitudinal reference axis; and
a convergent lens element fixedly mounted with respect to the fixed support, the convergent lens element comprising a lateral portion disposed beside the longitudinal reference axis in an angular sector which is able to be swept by the movable optical axis, and which is adapted to cause the offset beam to be modified as a function of an offset angle defined between the movable optical axis and the longitudinal reference axis, wherein the lateral portion of the convergent lens element comprises a lateral end portion having a lens optical axis which forms, with the longitudinal reference axis, a predetermined angle that is substantially equal to a maximum of the offset angle.

12. A headlight according to claim 11, wherein the lateral portion of the convergent lens element comprises at least one intermediate portion which is adjacent to the lateral end portion, and which, in cross section through a vertical plane, has a convex profile which develops angularly along the lateral portion, whereby a width of the offset beam increases progressively from the angular rest position as the offset angle increases.

13. A headlight according to claim 11, wherein the convergent lens element comprises a front portion adjacent to the lateral portion, the optical axis of which is substantially parallel to the longitudinal reference axis, with its focal plane being situated close to a second focus of the elliptical reflector, when the elliptical reflector is occupying the angular rest position, the movable optical axis being substantially coincident with the longitudinal reference axis, so that the headlight is able to produce at least one additional regulation lighting beam when the elliptical reflector is occupying the angular rest position, and wherein the front portion of the convergent lens element is a semi-cylindrical lens with a substantially horizontal axis, and the lateral end portion of the lateral portion is a spherical type lens portion.

14. A headlight according to claim 13, wherein the elliptical reflector has a substantially parabolic horizontal generatrix and a substantially elliptical vertical generatrix.

15. A headlight according to claim 11, wherein the convergent lens element comprises a front portion adjacent to the lateral portion, the optical axis of which is substantially parallel to the longitudinal reference axis, with its focal plane being situated close to a second focus of the elliptical reflector, when the elliptical reflector is occupying the angular rest position, the movable optical axis being substantially coincident with the longitudinal reference axis, so that the headlight is able to produce at least one additional regulation lighting beam when the elliptical reflector is occupying the angular rest position, and wherein the front portion of the convergent lens element is a spherical type lens portion, and the lateral end portion of the lateral portion is a semi-cylindrical lens with a substantially horizontal axis.

16. A headlight of a vehicle with a plurality of steerable wheels comprising, in a direction along a horizontal longitudinal reference axis:

an elliptical reflector having a first and a second focus;

a light source disposed close to a first focus of the reflector, the reflector and the light source defining a light beam with a movable optical axis substantially coincident with the longitudinal reference axis and being mounted for movement about a substantially vertical axis with respect to a fixed support of the vehicle as a function of a steering angle of the steerable wheels of the vehicle;

a convergent lens element fixedly mounted with respect to the support, the convergent lens element having a lateral lens portion disposed beside the longitudinal reference axis in an angular sector which is able to be swept by the movable optical axis, and which is adapted to cause the beam to be modified as a function of an offset angle defined between the movable optical axis and the longitudinal reference axis, a front lens portion adjacent to the lateral lens portion, the optical axis of which is substantially parallel to the longitudinal reference axis, with a focal plane of the front lens portion being situated close to the second focus of the reflector, when the reflector is occupying an angular rest position; and a fixed mask which is disposed longitudinally between the reflector and the convergent lens element, the mask having a front mask portion substantially orthogonal to the longitudinal reference axis and which is disposed generally in the focal plane of the front lens portion; and a lateral mask portion configured to be substantially orthogonal to at least one optical axis of the lateral lens portion.

17. A headlight according to claim 16, wherein the mask comprises an upper part which is disposed generally in the focal plane of the front lens portion, and which delimits, with the front mask portion, a window configured to permit passage of light rays to reduce near lighting emitted by the headlight when the reflector is occupying the angular rest position.

18. A headlight according to claim 16, wherein the front mask portion and lateral mask portion consist of two generally rectangular plates disposed parallel to each other and aligned longitudinally.

* * * * *